United States Patent
Degani et al.

(10) Patent No.: US 9,066,355 B2
(45) Date of Patent: Jun. 23, 2015

(54) CENTRAL WIRELESS NETWORK SELECTION AND MONITORING FOR MOBILE CLIENT TERMINALS

(71) Applicant: Gallery I.P. Telephony Ltd., RaAnana (IL)

(72) Inventors: Avihai Degani, Ramot-HaShavim (IL); Amir Shapira, RaAnana (IL)

(73) Assignee: Gallery I.P. Telephony Ltd., RaAnana (IL)

(*) Notice: Subject to any disclaimer, the term of this patent is extended or adjusted under 35 U.S.C. 154(b) by 95 days.

(21) Appl. No.: 13/915,692

(22) Filed: Jun. 12, 2013

(65) Prior Publication Data

US 2013/0329666 A1 Dec. 12, 2013

Related U.S. Application Data

(60) Provisional application No. 61/658,485, filed on Jun. 12, 2012.

(51) Int. Cl.
| | |
|---|---|
| *H04Q 7/00* | (2006.01) |
| *H04W 72/08* | (2009.01) |
| *H04W 28/08* | (2009.01) |
| *H04W 48/16* | (2009.01) |
| *H04W 48/18* | (2009.01) |

(52) U.S. Cl.
CPC .............. *H04W 72/08* (2013.01); *H04W 28/08* (2013.01); *H04W 48/18* (2013.01); *H04W 48/16* (2013.01)

(58) Field of Classification Search
USPC .......................................... 455/422.1, 432.1
See application file for complete search history.

(56) References Cited

U.S. PATENT DOCUMENTS

| | | | | |
|---|---|---|---|---|
| 2008/0039089 | A1* | 2/2008 | Berkman et al. | 455/436 |
| 2008/0130597 | A1* | 6/2008 | Kalhan | 370/338 |
| 2008/0261615 | A1* | 10/2008 | Kalhan | 455/456.1 |
| 2011/0320588 | A1* | 12/2011 | Raleigh | 709/224 |
| 2012/0238234 | A1* | 9/2012 | Duarte | 455/404.1 |

* cited by examiner

*Primary Examiner* — Duc C Ho

(57) ABSTRACT

A method of selecting a wireless network for a plurality of mobile client terminals. The method comprises monitoring at least one network selection parameter of each of a plurality of wireless networks in a plurality of different geographical areas, identifying a group of the plurality of wireless networks which are available for providing a network service to a first of a plurality of mobile client terminals in one of the plurality of different geographical areas, selecting at least one member of the group according to respective the at least one network selection parameter, and sending a network message instructing the first mobile client terminal to establish automatically a connection via the at least one member.

25 Claims, 5 Drawing Sheets

CENTRAL WIRELESS NETWORK SELECTION AND MONITORING FOR MOBILE CLIENT TERMINALS

RELATED APPLICATION

This application claims the benefit of priority under 35 USC 119(e) of U.S. Provisional Patent Application No. 61/658,485 filed Jun. 12, 2012, the contents of which are incorporated herein by reference in their entirety.

FIELD AND BACKGROUND OF THE INVENTION

The present invention, in some embodiments thereof, relates to data offloading and, more particularly, but not exclusively, data offloading based on quality of service analysis.

Recently a variety of computer network systems have been widely used. Such network systems including a local area network (LAN), a wide area network (WAN), a wireless local area network (WLAN), such as—Wi-Fi a general packet radio service (GPRS) network and other cellular networks like 3G HDPA and LTE wireless network systems. The network systems allow communication between various client terminals such as a personal computer (desktop, lap top, palm top, tablets), a mobile phone, or other portable communication devices.

The ever-increasing capabilities of mobile client terminals continue to drive bandwidth demand. For example, the recent introduction of multi-media—enabled, large screen mobile client terminals is likely to stimulate growing demand for downlink and uplink bandwidth as users increasingly share data content with friends and associates. Moreover, users will increasingly wish to access and share data content, such as movies and pictures, now that their user devices include the capability of easily creating and sharing such data content. Further, as additional user-valued data content and services become and are made more readily available, bandwidth demand will increase. For similar reasons, the transfer of data over wired networks is also expected to increase in the future. Accordingly, wired and wireless operators are expected to experience a growing problem caused by heavy data usage and the resultant detrimental effects, such detrimental effects including increased content delivery failure, inability to serve all users, increase operator and user costs for the delivery of content, and the like.

SUMMARY OF THE INVENTION

According to some embodiments of the present invention, there is provided a method of centrally selecting a wireless network for a plurality of mobile client terminals. The method comprises monitoring at least one network selection parameter of each of a plurality of wireless networks in a plurality of different geographical areas, identifying a group of the plurality of wireless networks which are available for providing a network service to a first of a plurality of mobile client terminals in one of the plurality of different geographical areas, selecting at least one member of the group according to respective the at least one network selection parameter, and sending a network message instructing the first mobile client terminal to establish automatically a connection via the at least one member.

Optionally, the network message instructing an offloading of the first mobile client terminal from using a cellular network for network communication to using the at least one member for another network communication.

Optionally, the another network communication at least one of a non cellular network communication and different cellular network communication.

Optionally, the monitoring comprises receiving data indicative of the at least one network selection parameter of each of the plurality of wireless networks from the plurality of mobile client terminals.

More optionally, the data is an outcome of a test locally performed by one of the plurality of mobile client terminals.

More optionally, the monitoring is performed according to data gathered from the plurality of mobile client terminals.

Optionally, monitoring comprises: identifying a communication congestion in a first of the plurality of wireless networks, selecting the first mobile client terminal accordingly, and inquiring the first mobile client terminal for the group. The mobile client terminal switches from using the first wireless network to using the at least member.

More optionally, the selecting the first mobile client terminal is performed according to a member of a group consisting of a received signal strength indication (RSSI) of the first mobile client terminal, a speed connectivity of the first mobile client terminal, a network slowing down pertaining to the first mobile client terminal, and a service grade given to the first mobile client terminal by a cellular network operator.

Optionally, the process in claim 8 is iteratively repeated with different of the plurality of mobile client terminals until the communication congestion is over.

Optionally, the plurality of wireless networks comprises a plurality of wireless local area networks (WLANs).

Optionally, the identifying comprises receiving an additional network message indicative of the group from the first mobile client terminal.

More optionally, the network message is sent in response to the additional network message.

More optionally, the network message is sent periodically by the first mobile client terminal.

More optionally, the identifying comprises sending a query to the mobile client terminal and receiving the network message in response to the query.

Optionally, the selecting comprises filtering at least one another member of the group according to a quality of service (QoS) level of a network service it provides.

Optionally, the at least one network selection parameter comprises a quality of service (QoS) level of a respective network service.

Optionally, the at least one network selection parameter comprises a roaming cost.

Optionally, the method further comprises monitoring a network service usage of the first mobile client terminal and performing the selecting according to the type of network service usage.

Optionally, the at least one member comprises a plurality of members and the network message instructing the first mobile client terminal to establish automatically the connection according to a certain ranking given according to the respective at least one network selection parameter.

According to some embodiments of the present invention, there is provided a method of selecting a wireless network for a mobile client terminal. The method comprises detecting a plurality of wireless networks available for providing a communication service to a mobile client terminal, sending a message indicative of the plurality of wireless networks to a central network allocating controller via at least one of the plurality of wireless networks, receiving from the network allocating controller a wireless network selection data, selecting a first of the plurality of wireless networks according to the network selection data, and establishing a connection with the first wireless network and providing the communication service to the mobile client terminal using the first wireless network.

Optionally, the network selection data comprises a ranking of each of the plurality of wireless networks, the ranking is indicative of at least one network selection parameter.

Optionally, the network selection data comprises a filtered group selected from the plurality of wireless networks.

According to some embodiments of the present invention, there is provided a central wireless network selection system. The system comprises a monitoring module which aggregates for each of a plurality of wireless networks in a plurality of different geographical areas at least one network selection parameter, a network selection controller which identifies a group of the plurality of wireless networks which are available for providing a network service to a first of a plurality of mobile client terminals in one of the plurality of different geographical areas and selects at least one member of the group according to respective the at least one network selection parameter, and a interface which sends a network message instructing the first mobile client terminal to establish automatically a connection via the at least one member.

According to some embodiments of the present invention, there is provided a system for selecting wireless networks for mobile client terminals. The system comprises a plurality of network selecting modules each installed in one of a plurality of mobile client terminals and sends a network message indicative of a group of a plurality of wireless networks, each member of the group being available for providing a network service to a respective the sending mobile client terminal, a database which aggregates for each of the plurality of wireless networks at least one network selection parameter, and a network selection controller which receives the network message, selects at least one member of the group according to respective the at least one network selection parameter, and sends an additional network message indicative of the at least one member in response to the network message. The network selecting module receives the additional network message and instructs a respective the mobile client terminal to establish automatically a connection via a respective the at least one member.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
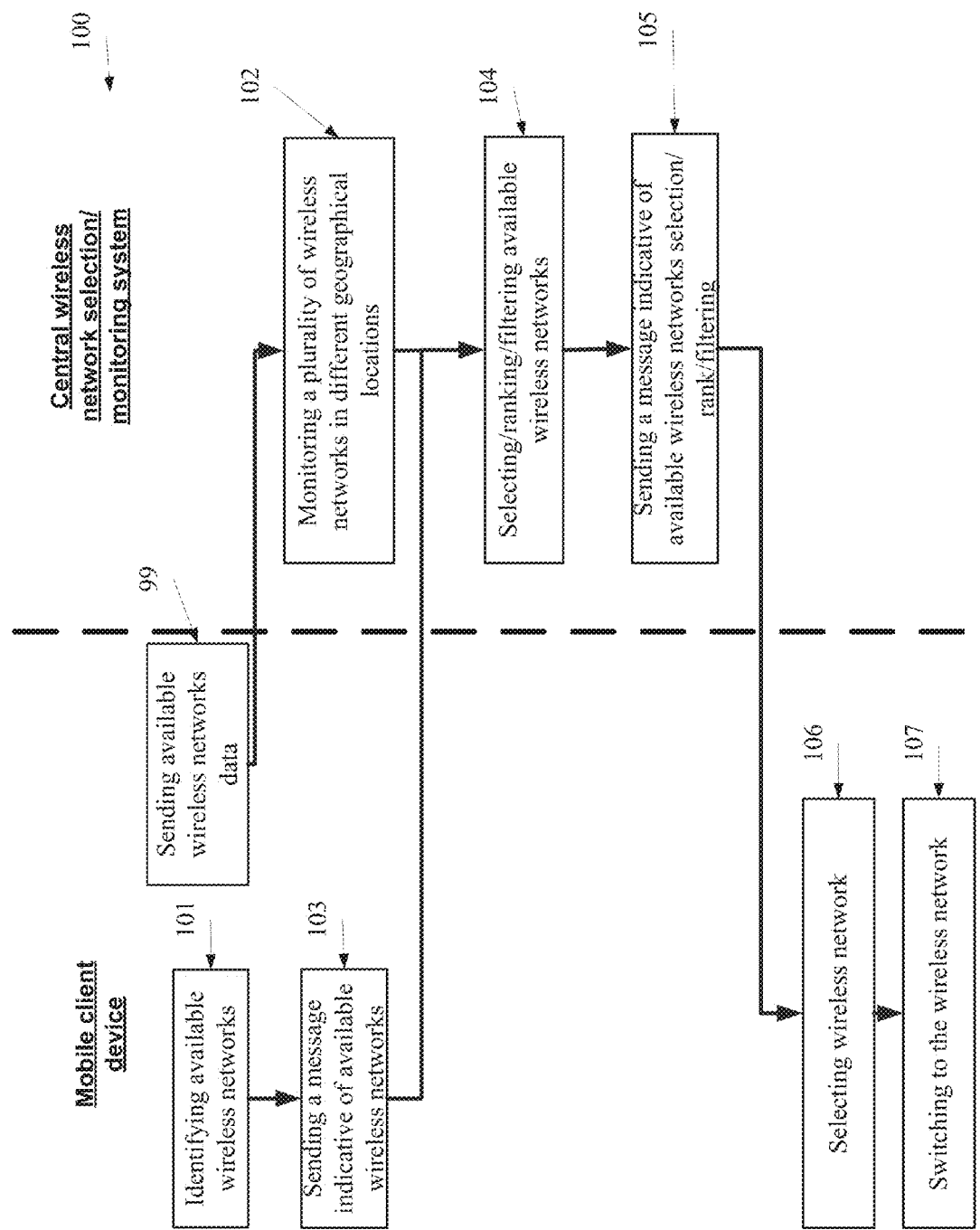
FIG. 1 is a process of selecting a wireless network to any of a plurality of mobile client terminals according to one or more network selection parameters which are remotely, and optionally centrally, monitored in real time, according to some embodiments of the present invention.

The present invention, in some embodiments thereof, relates to data offloading and, more particularly, but not exclusively, data offloading based on quality of service analysis.

According to some embodiments of the present invention, there are provided methods and systems for centrally managing which wireless networks, including cellular and WLANs, provide network services to which mobile client terminals by sending the mobile client terminals wireless network selection data. These methods and systems allow a central mechanism, for example a mechanism managed and controlled by a cellular network operator, to distribute offload commands to mobile client terminals (i.e. subscribers) according to quality of service data of wireless networks distributed in various geographical locations and according the mobile clients working application requirements e.g. voice, video and data. The quality of service data is optionally probed by the mobile client terminals themselves. Optionally, the central mechanism monitors a plurality of network selection parameters per wireless network, for example a database, and uses the plurality of network selection parameters for instructing offloading for managing network communication load for subscribers.

According to some embodiments of the present invention, a mobile client terminal sends to a central wireless network election/monitoring system data indicative of which wireless networks are currently available for providing him with a network service and receives accordingly instructions to which of the available wireless networks to connect. Optionally, the mobile client terminal, for example a Smartphone, hosts an application that automatically sends the data and implements the instructions.

According to some embodiments of the present invention, a central wireless network election/monitoring system instructs offloading of mobile client terminals to avoid and/or prevent communication congestion and/or overloading.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a process 100 of remotely, and optionally centrally, selecting a wireless network, for example a wireless local area network (WLAN) or a cellular network, for example long term evolution (LTE) and third generation (3G), to any of a plurality of mobile client terminals, according to some embodiments of the present invention. The selection may be performed according to one or more network selection parameters which are remotely, and optionally centrally, monitored, optionally in real time. For brevity, selecting a wireless network, such as a WLAN may also cover recommending, scoring, replacing and/or ranking a wireless network from a set of available wireless networks. As used herein, a mobile client terminal means any device which uses one or more wireless networks provided by one or more service providers, such as a cellular service, for example a Smartphone, a laptop, a tablet, and/or the like. As further described below, the network selection parameter(s) according to which wireless network may be selected for a certain mobile client terminal may include a type of one or more applications running on the certain mobile client terminal, the roaming cost of service network, a wireless network stability (i.e. coverage based on a signal strength measured by the certain mobile client terminal), Quality of Service (QoS) of the wireless network, and/or a service plan provided to the certain mobile client.

Figure 2:
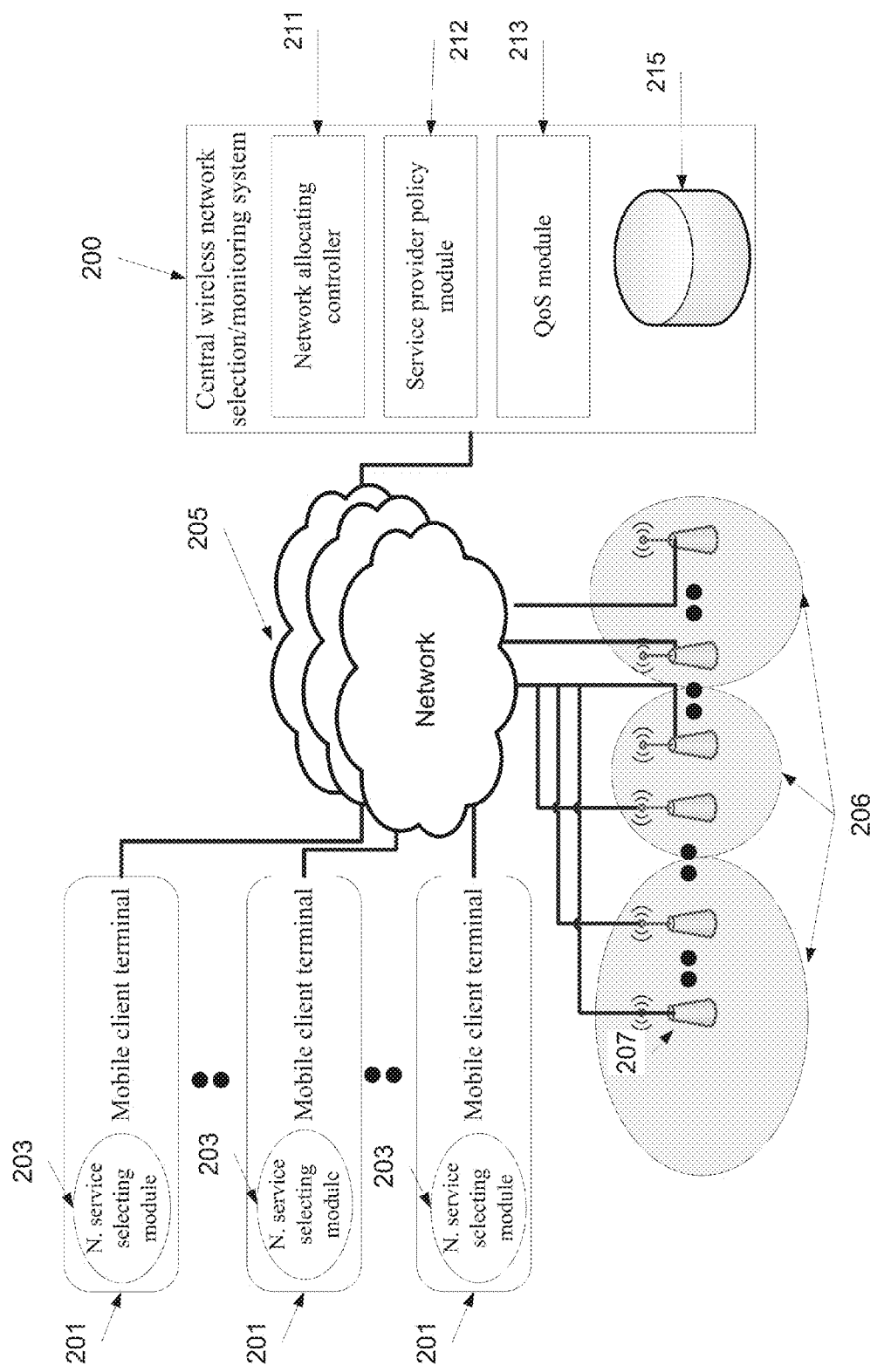
FIG. 2 is a schematic illustration of a plurality of mobile client terminals, according to some embodiments of the present invention.

Reference is also made to FIG. 2, which is a schematic illustration of a plurality of mobile client terminals 201, one or more communication networks 205, such as cellular networks, wireless area networks (WANs), and a computer network (i.e. the Internet), and a central wireless network (WN) selection/monitoring system 200, for brevity referred to herein as a central WN system 200 for selecting wireless network for each of a plurality of mobile client terminals 201, according to some embodiments of the present invention. It should be noted that the system 200 may be implemented on a single server and/or a plurality of servers, optionally distributed.

The central WN system 200 and the method 100 allows an operator, such as a mobile service provider, to operate a mechanism that selects which communication network provides communication services to mobile client terminals 201 which are using its services. In such a manner, the local wireless network managers of the mobile client terminals 201, for example the Wi-Fi managers of respective mobile phones, are replaced either permanently, alternately and/or temporarily.

In order to implement a network mechanism that allows central wireless network selection for the remote mobile client terminals 201, a plurality of wireless network selecting modules 203 are installed in the mobile client terminals 201. The wireless network selecting module 203 may be an app store or app market application, an operating system module, an agent, a hardware component, a firmware component, and/or the like.

The central WN system 200 optionally includes a network allocating controller 211 that is connected to the network 205, for example to a mobile service provider core network or the Internet. The central WN system 200 optionally further includes a service provider policy module 212 that is optionally connected to a service provider policies server and/or includes service provider policies dataset(s). A service provider policy optionally includes rules defining which QoS and/or service should be provided to which mobile client terminal based on a client type, a network state (available QoS), time of the day, week, month and/or year and/or the like. The central WN system 200 optionally further includes a QoS module 213 that is connected to the network(s) 205 and calculates QoS data based on test outcomes provided by mobile client terminals, different WLAN access points (APs) or available mobile cells in different geographical locations 206, such as 207, should change the number already used, connected to the network 205.

In use, as shown at 101, each mobile client terminal 201 identifies available offload options, for example by scanning for available WLANs, such as Wi-Fi APs, wireless services, such as worldwide interoperability for microwave access (WiMAX™), LTE and/or cellular networks, for example 2G and 3G services. Optionally, the respective wireless network selecting module 203 uses the scanning mechanism of the mobile client terminal 201. For example, in case of a WLAN scan, such as a Wi-Fi scan, the results may be based on the results of a Wi-Fi finder technology which detects Wi-Fi networks in the area. The scanning may be performed upon the activation of the mobile client terminal, periodically, upon receiving a triggering message, for example from the central WN system 200, in response to a disconnection and/or signal strength change from a wireless network it is currently connected to, and/or in response to a local change in the QoS it receives from a wireless network it is currently connected to. For example, while the mobile client terminal 201 uses a default network, such as a mobile network (e.g. 2G or 3G) it performs a scanning session for detecting offload options periodically.

Additionally or alternatively, scan sessions are held continuously, for example every interval, enabled based on geographical locations, enabled based on temporal allocation, and or the like. Additionally or alternatively, the scan session may be held iteratively when there is no activity on the mobile client terminal for more than a certain period, optionally until a communication network is selected. The scan session may be initiated when the display of the mobile client terminal is on and there is no active cellular call and/or optionally no active GPS session with a speed measured higher than several kilometers per hour (to detect driving state which is not relevant).

As shown at 102, the central WN system 200, for example the network allocating controller 211 and/or the QoS module 213 monitor one or more network selection parameters of each of a plurality of wireless network in different geographical locations in real time. The monitored parameters optionally include parameters such as current roaming cost of each network, current user classification, and/or one or more current indications the service providers, for example communication congestion level and/or the like.

The monitored parameters optionally include different score for different services which requires different QoS levels, for example a voice quality parameter, a video streaming quality and/or a data quality parameter. Each QoS parameter is optionally defined by a bandwidth, delay and a packet loss ratio.

According to some embodiments of the present invention, the mobile client terminals 203 function as network QoS probes, for example as instructed by the WN system 200. Optionally, data gathered from the mobile client terminals, for example by the plurality of wireless network selecting modules 203, is aggregated and stored in the database of the WN system 200, for example in one or more network selection parameter datasets. For example, as shown at 99, the mobile client terminal for which a network is selected is operated so as to send data, such as a QoS probe data. The wireless network selecting modules 203 optionally query the central WN system 200 iteratively, for example every few minutes, the query rate may change due to the type of activity on the mobile client for example if there is no activity the query can be done every 5 minutes to save power and if there are one or more activities, every minute. The query may be done as a connectivity check and/or for receiving probing and/or network switching commands from the network allocating controller 211 of the central WN system 200. Other probes may be used for updating the one or more network selection parameter datasets.

Optionally, the mobile client terminals and/or other probes perform a QoS test by either transmission control protocol (TCP) and/or user datagram protocol (UDP) download and/or upload test, optionally combined with internet control message protocol (ICMP)-Ping test. Test results include available bandwidth, delay, packet loss ratio and/or network signal strength are forward to the network allocating controller 211. The test results are stored in the network selection parameter datasets, for example in a database 215. The network allocating controller 211 may calculate the effective bandwidth of the networks by performing a periodic calculation of the available bandwidth data using the results collected in the last interval. For example, the calculation takes all the results recorded in a certain period, for example the last several minutes and calculates the available bandwidth giving more weight to later results in order to follow QoS changes quickly. Optionally, the signal strength is taken into consideration as well and low results with low signal strength are not added to the calculation, since the low results can be due to the low reception and not due to network problems. The network allocating controller 211 holds network status for all available networks to be used for offload decisions.

In order to avoid overloading the network and reducing power consumption of mobile client terminals, when there are many mobile client terminals within an area of service of a certain AP or mobile cell, the network allocating controller 211 selects, in every interval, randomly and/or sequentially a certain amount of users out of the total users available which are instructed to perform QoS test.

Now, as shown at 103, a message indicative a group of available wireless networks are sent to the network allocating controller 211 via a connection to one of the networks 205, for example a current network connection and/or a default network connection. For example, the group may include a plurality of WLANs and optionally cellular network(s) which are currently available.

The message may be a pull (the client wants to get information from the center) message, initiated by the mobile client terminal 201, or a response to a push message sent by the network allocating controller 211. The pull message may be set periodically and/or in response to an event, such as a low QoS, a wireless network disconnection, a location change, a usage change and/or an operation outcome of the mobile client terminal 201 and/or the like.

As shown at 104, this allows the network allocating controller 211 to select one or more of the available wireless networks, to rank the available wireless networks, and/or to filter one or more of the available wireless networks according to network selection parameters which are related to them. For example, the QoS level provided by each member of the group is estimated according the data from the network selection parameter datasets. Optionally, in case none of the networks available meets the required QoS levels and/or does not provide a better alternative to the current used network, the mobile client is instructed to stay on the current network.

Optionally, the selection, ranking and/or filtering may be optimized according to the roaming costs of the networks, for example by selecting the lowest cost network which meets a certain minimum QoS and/or selecting the network with the best QoS in a certain cost range. Optionally, the optimization is dictated by a policy set by the system operator, for example the mobile service operator of the respective user of the mobile client terminal.

Optionally, the selection, ranking and/or filtering may be performed according to the monitored network selection parameters, which are related to the current operation of the mobile client terminal. For example, if the mobile client terminal is currently used for voice communication, the voice quality levels of the network selection parameters is used for selection, ranking and/or filtering and/or received a higher weight. In another example, if the mobile client terminal is currently used for data communication, the data transfer quality levels of the network selection parameters is used for selection, ranking and/or filtering and/or received a higher weight. In such embodiments, the user activity allows the user to automatically select a network which meets the required criteria. If there are a number of operations held simultaneously, for example data and voice applications, the most demanding operations will be used for decision making.

According to some embodiments of the present invention, the network allocating controller 211 selects, ranks, and/or filters available wireless networks according to an estimated network QoS that is calculated and/or selected per available wireless network, for example per AP, cellular network in a respective area (cellular cells), and/or the like. In such an embodiment, the network allocating controller 211 evaluates a current load level for each documented wireless network, for example in the network selection parameter datasets, and a desired load level that is optionally based on the type and/or classifications of the mobile client terminals which are connected thereto.

Now, as shown at 105, a message, for example a response to the received message, a periodic push message to mobile devices, and/or a message induced by analyzing the monitored data, is sent from the central WN system 200 to the mobile client terminal 201 via the network 205. The message is optionally an offload command with one or more selected networks to the mobile device. Optionally, if none of the networks meet the minimum requirements, for example QoS minimum requirements, no offload command is issued.

As shown at 106, this induces a wireless network selection and/or a switch from one wireless network to another communication network. As shown at 107, this allows the mobile client terminal 201 to switch to the selected wireless network, for example by instructing the respective network interfaces, for instance as known in the art.

Figure 3:
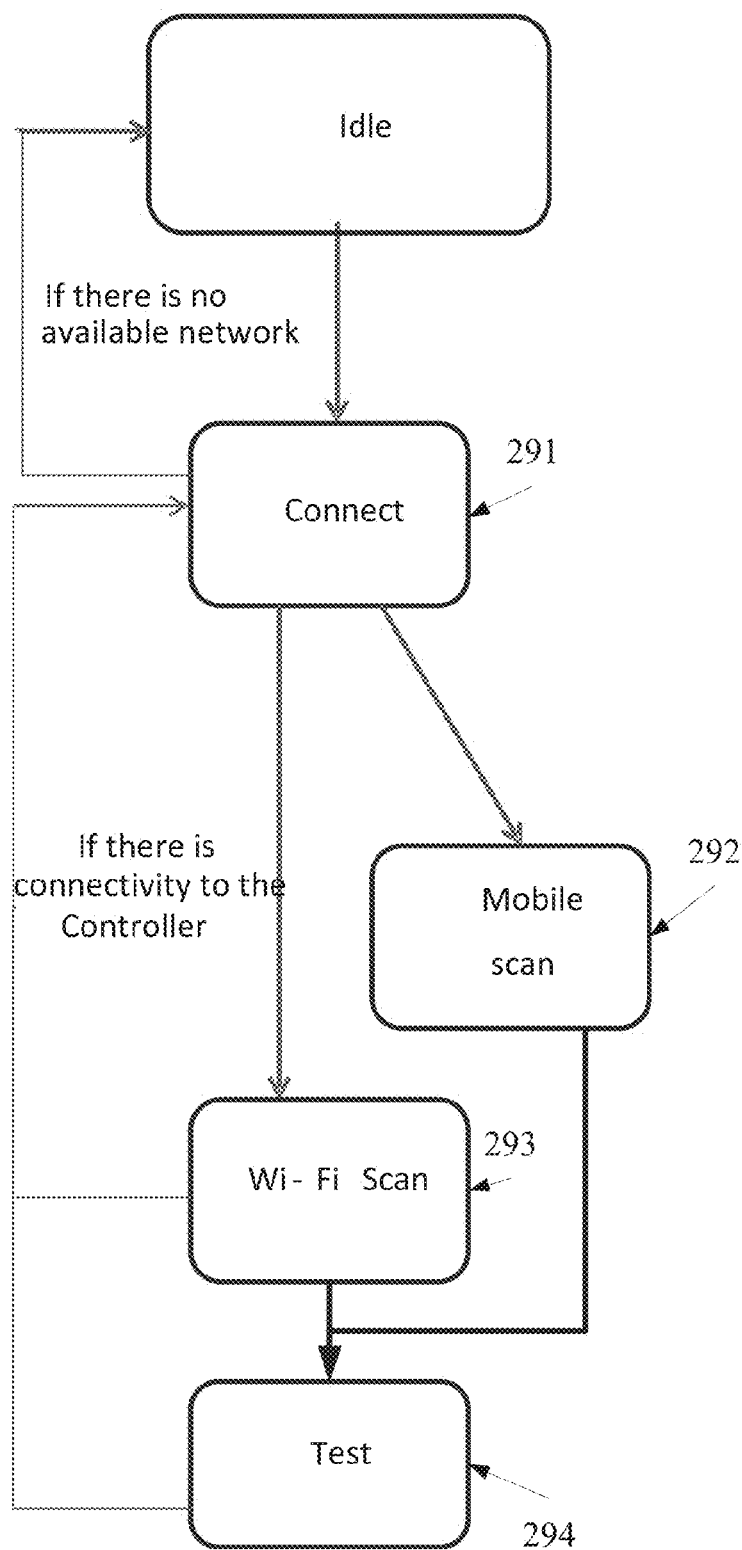
FIG. 3 is an exemplary process of wireless network selection that is initiated by the mobile client terminal, according to some embodiments of the present invention.

Reference is now also made to FIG. 3, which is an exemplary process of wireless network selection that is initiated by the mobile client terminal 201, according to some embodiments of the present invention. In this exemplary process, as shown at 291, when network connectivity status is changed i.e. the mobile device has connected to the default network for example 3G network. When a scan is triggered, for example due to user activity on the mobile device, than connectivity to the network allocating controller 211 is checked. If there is connectivity, a scan is performed and selection, ranking and/or filtering are requested from the network allocating controller 211 for available wireless networks. Optionally, as shown at 292, 293 available mobile and Wi-Fi networks are scanned and information thereabout is sent to the network allocating controller 211.

This allows selecting a wireless network based on the response from the network allocating controller 211. Optionally, as shown at 294, the connected network may be tested, optionally periodically to provide the network allocating controller 211 with QoS information.

Figure 4:
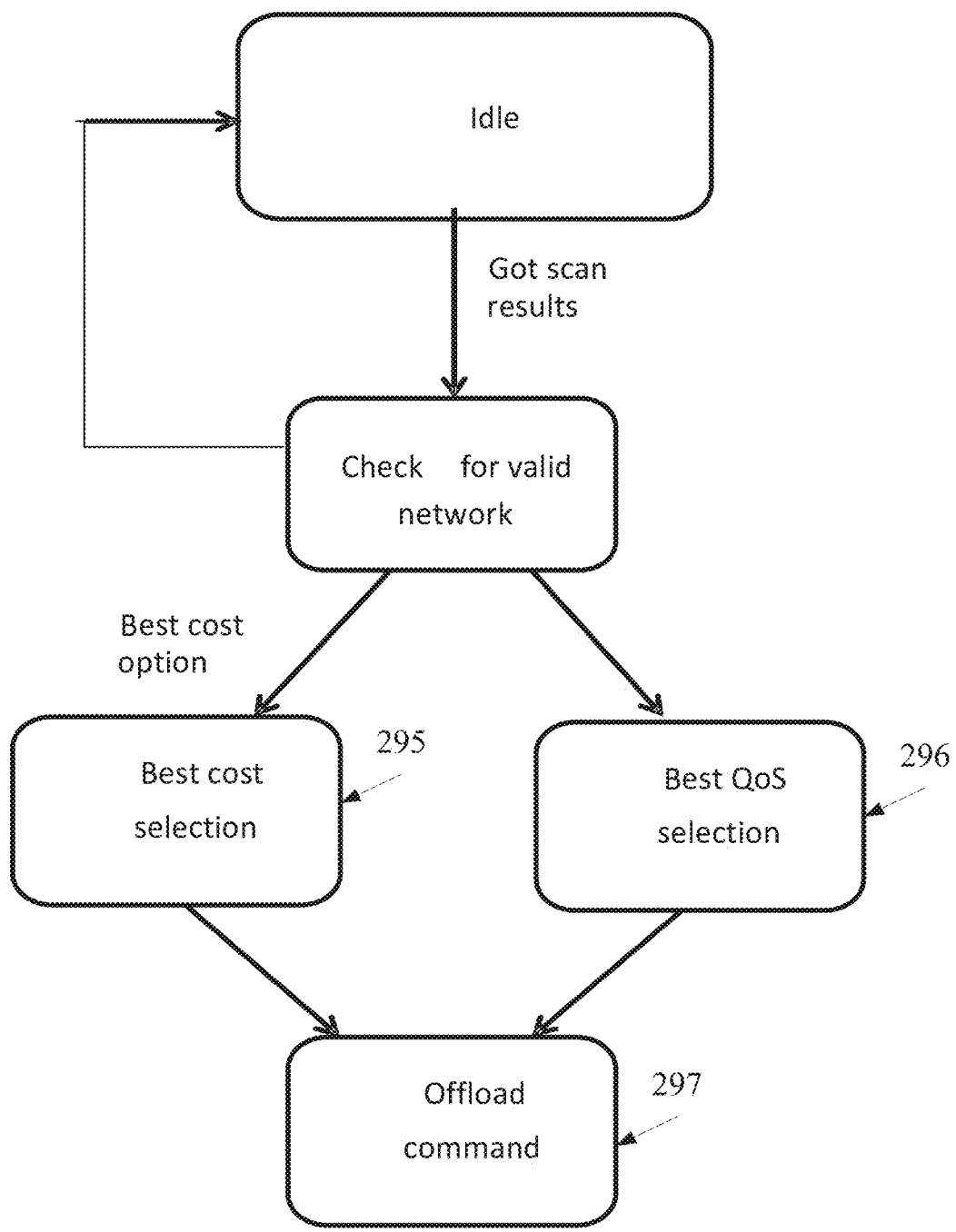
FIG. 4 is another exemplary process of wireless network selection based on a policy set by a network service provider, according to some embodiments of the present invention.

Reference is now also made to FIG. 4, which is another exemplary process of wireless network selection based on a policy set by a network service provider, according to some embodiments of the present invention. In this exemplary process, valid networks, for example, networks which are defined in the database 215 as a wireless network of a certain cellular network provider or of a roaming partner, as an uncongested network, as a network without a connectivity problem and/or as an unblocked network are identified and selected according to a best cost selection 295 and/or QoS selection 296. For the best cost selection 295, the operator defines a maximum cost to be paid for a wireless network and a minimum QoS requirement. Within these limitations the network allocating controller 211 selects the valid network that offers the best QoS possible which still meets the cost requirements. For the QoS selection 296, the operator defines a maximum cost to be paid for a wireless network, and a minimum QoS requirement. As shown at 297, the network allocating controller 211 selects a wireless network within these limitations but with the least roaming cost. Based on these selections an offload command is send.

Optionally the cost and minimum QoS requirement may change according to the time of day and/or the geographical location of the mobile client terminal 201.

As described above, the network allocating controller 211 remotely control switching the network to that a mobile client terminal is connected based on one or more monitored network selection parameters of networks which are available for the respective mobile client terminal. In some embodiments of the present invention, the network selecting module 203 determines to which wireless network the hosting mobile client terminal 201 is connected to. Optionally, a set of default networks, for example user selected wireless networks, such as selected Wi-Fi APs, are selected automatically when detected, optionally regardless to switching instructions received from the network allocating controller 211. Optionally, the offloading process does not start when the mobile client terminal 201 is connected to one of the default networks, for example home and/or office network. Optionally, if no connectivity with the network allocating controller 211 is detected, the network selecting module 203 manages the wireless network selection locally as a common local wireless network manager. Optionally, the user of the mobile client terminal 201 may define offloading rules. For example, if the user reaches his/her known network which is not in the default networks list, the user may force switch his/her mobile client terminal making a local decision.

As described above, the network allocating controller 211 may monitor the QoS of some or all of the networks which are documented by the central WN system 200, for example in the database 215. According to some embodiments of the present invention, the network allocating controller 211 initiates switch over of mobile client terminals from one network to another in order to prevent communication congestion and/or for load balance. For example, mobile client terminals are switched to other networks in order to reduce load from a certain network for achieving a desired minimum QoS. In use, the switched mobile device may switch from a certain AP to a mobile network and restart a scanning process. Optionally, for example in a case of congestion, not all the mobile client terminals are switched at once. For example, a percentage of the mobile client terminals is switched back every interval. The controller 211 decides how to proceed in each interval according to a current measured QoS level with the reduced number of mobile client terminals, for example whether to switch mobile client terminals or not.

Optionally, the switching priority of mobile client terminals are as follows:

mobile client terminals with a link having a low received signal strength indication (RSSI) and/or low speed connectivity in case of a Wi-Fi network or mobile users with low receptions levels i.e.

mobile client terminals which are slowing down the network; and mobile client terminals with a lower service grade according to one or more respective cellular network operator policies.

This switch over both improves the network performance and reduces the load resolving the congestion.

During congestion the controller blocks the network and does not offload new users to the network until the level of available QoS certain percentages above a defined congestion level. This may be done to prevent oscillation of users between networks.

Figure 5:
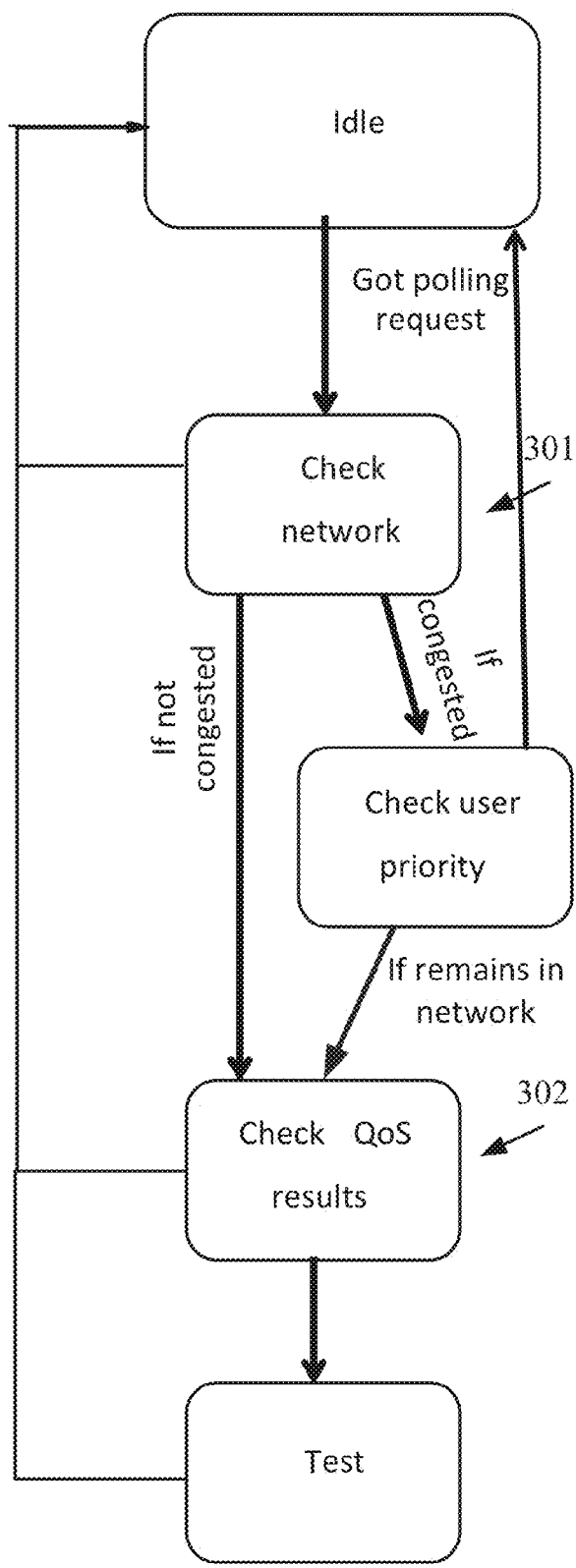
FIG. 5 is a flowchart of a process of query between mobile client terminals and the central unit which can result in the central unit initiates offloading of mobile client terminals from one network to another in order to prevent communication congestion and/or for load balancing, according to some embodiments of the present invention.

For example, reference is now also made to FIG. 5 which is a flowchart 300 of a process wherein mobile client terminal 201 queries—a central unit, such as the network allocating controller 211, which initiates QoS testing sessions and alternatively offloading of mobile client terminals from one network to another in order to prevent communication congestion and/or for load balancing. The process may be implemented on some or all of the networks monitored by the WM system 200. As shown at 301, the network allocating controller 211 when a monitored network is identified as congested user priority is checked. As described above, some of the users (e.g. a percentage of the total number of users) may be switched based on the user type and/or ranking, also referred to as priority. As shown at 302, when no communication congestion is identified or if the user remain on the network although congested, and for example if there are not enough test results for the specific network (for the last interval) then a QoS test is requested from the mobile client terminal 201. As described above, the QoS test may be performed by mobile client terminals which are optionally requested to do so, the tests results are send to the controller 211 for QoS calculation.

It is expected that during the life of a patent maturing from this application many relevant systems and methods will be developed and the scope of the term a network, a mobile client terminal, a server, a wireless network, and a communication network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of centrally selecting a wireless network for a plurality of mobile client terminals, comprising:
   monitoring at least one network selection parameter of each of a plurality of wireless networks in a plurality of different geographical areas;
   identifying a group of said plurality of wireless networks which are available for providing a network service to a first of a plurality of mobile client terminals in one of said plurality of different geographical areas;
   selecting at least one member of said group according to respective said at least one network selection parameter; and
   sending a network message instructing said first mobile client terminal to establish automatically a connection via said at least one member.

2. The method of claim 1, wherein said network message instructing an offloading of said first mobile client terminal from using a cellular network for network communication to using said at least one member for another network communication.

3. The method of claim 1, wherein said another network communication at least one of a non cellular network communication and different cellular network communication.

4. The method of claim 1, wherein said monitoring comprises receiving data indicative of said at least one network selection parameter of each of said plurality of wireless networks from said plurality of mobile client terminals.

5. The method of claim 4, wherein said data is an outcome of a test locally performed by one of said plurality of mobile client terminals.

6. The method of claim 4, wherein said monitoring is performed according to data gathered from said plurality of mobile client terminals.

7. The method of claim 1, wherein monitoring comprises:
   identifying a communication congestion in a first of said plurality of wireless networks,
   selecting said first mobile client terminal accordingly, and inquiring said first mobile client terminal for said group;
   wherein said mobile client terminal switches from using said first wireless network to using said at least member.

8. The method of claim 7, wherein said selecting said first mobile client terminal is performed according to a member of a group consisting of a received signal strength indication (RSSI) of said first mobile client terminal, a speed connectivity of said first mobile client terminal, a network slowing down pertaining to said first mobile client terminal, and a service grade given to said first mobile client terminal by a cellular network operator.

9. The method of claim 7, wherein said monitoring is iteratively repeated with different of said plurality of mobile client terminals until said communication congestion is over.

10. The method of claim 1, wherein said plurality of wireless networks comprises a plurality of wireless local area networks (WLANs).

11. The method of claim 1, wherein said identifying comprises
receiving an additional network message indicative of said group from said first mobile client terminal.

12. The method of claim 11, wherein said network message is sent in response to said additional network message.

13. The method of claim 11, wherein said network message is sent periodically by said first mobile client terminal.

14. The method of claim 11, wherein said identifying comprises sending a query to said mobile client terminal and receiving said network message in response to said query.

15. The method of claim 1, wherein said selecting comprises filtering at least one another member of said group according to a quality of service (QoS) level of a network service it provides.

16. The method of claim 1, wherein said at least one network selection parameter comprises a quality of service (QoS) level of a respective network service.

17. The method of claim 1, wherein said at least one network selection parameter comprises a roaming cost.

18. The method of claim 1, further comprising monitoring a network service usage of said first mobile client terminal and performing said selecting according to a type of network service usage.

19. The method of claim 1, wherein said at least one member comprises a plurality of members and said network message instructing said first mobile client terminal to establish automatically said connection according to a certain ranking given according to said respective at least one network selection parameter.

20. A non-transitory computer readable medium comprising computer executable instructions adapted to perform the method of claim 1.

21. A method of selecting a wireless network for a mobile client terminal, comprising:
detecting a plurality of wireless networks available for providing a communication service to a mobile client terminal;
sending a message indicative of said plurality of wireless networks to a central network allocating controller via at least one of said plurality of wireless networks;
receiving from said network allocating controller a wireless network selection data; selecting a first of said plurality of wireless networks according to said network selection data; and
establishing a connection with said first wireless network and providing said communication service to said mobile client terminal using said first wireless network.

22. The method of claim 21, wherein said network selection data comprises a ranking of each of said plurality of wireless networks, said ranking is indicative of at least one network selection parameter.

23. The method of claim 21, wherein said network selection data comprises a filtered group selected from said plurality of wireless networks.

24. A central wireless network selection system, comprising:
a monitoring module which aggregates for each of a plurality of wireless networks in a plurality of different geographical areas at least one network selection parameter;
a network selection controller which identifies a group of said plurality of wireless networks which are available for providing a network service to a first of a plurality of mobile client terminals in one of said plurality of different geographical areas and selects at least one member of said group according to respective said at least one network selection parameter; and
a interface which sends a network message instructing said first mobile client terminal to establish automatically a connection via said at least one member.

25. A system for selecting wireless networks for mobile client terminals, comprising:
a plurality of network selecting modules each installed in one of a plurality of mobile client terminals and sends a network message indicative of a group of a plurality of wireless networks, each member of said group being available for providing a network service to a respective said sending mobile client terminal;
a database which aggregates for each of said plurality of wireless networks at least one network selection parameter; and
a network selection controller which receives said network message, selects at least one member of said group according to respective said at least one network selection parameter, and sends an additional network message indicative of said at least one member in response to said network message;
wherein a respective said network selecting module receives said additional network message and instructs a respective said mobile client terminal to establish automatically a connection via a respective said at least one member.

* * * * *